United States Patent [19]

Scrimshire

[11] Patent Number: 4,664,926
[45] Date of Patent: May 12, 1987

[54] METHOD FOR PROCESSING BLACK RIPE OLIVES

[75] Inventor: Hershell Scrimshire, Visalia, Calif.

[73] Assignee: Early California Foods, Inc., Visalia, Calif.

[21] Appl. No.: 804,402

[22] Filed: Dec. 2, 1985

[51] Int. Cl.$^4$ .......................... A23B 7/00; A23L 1/27
[52] U.S. Cl. .................................. 426/270; 426/302; 426/615; 426/519
[58] Field of Search ............... 426/270, 615, 302, 321, 426/263, 519

[56] References Cited

U.S. PATENT DOCUMENTS

| | | | |
|---|---|---|---|
| 2,464,947 | 3/1949 | Sammis | 426/302 |
| 2,582,371 | 1/1952 | Ball | 426/270 |
| 3,085,881 | 4/1963 | Ball | 426/615 |
| 4,463,023 | 7/1984 | McCorkle | 426/270 |

OTHER PUBLICATIONS

Jasper Guy Woodroof and Bor Shiun Luh, *Commercial Fruit Processing*, Westport, Ct. (1975), pp. 204–217.
"Memorandum on Standard and Approved Practices for Using Ferrous Gluconate to Fix Color in Ripe Olives", University of California Food Technology Department (about 1965).
W. V. Cruess, "Experiments on Color Fixation with Iron Salts", Forty-First Annual Technical Report of California Olive Association, Monterey, Calif. (1962) pp. 1–13.
Frank J. Mondok, Jr., "Carbon Dioxide Gas Applications in the Olive Industry", Fifty-Seventh Annual Technical Report of the California Olive Association, Napa, Calif. (1979) pp. 42–52.

*Primary Examiner*—George Yeung
*Attorney, Agent, or Firm*—Nilsson, Robbins, Dalgarn, Berliner, Carson & Wurst

[57] ABSTRACT

A method and apparatus for producing black ripe olives is provided which comprises immersing the olives in an alkaline solution until the solution penetrates to the pit of the olive to eliminate the bitter principal, and then neutralizing the lye solution by immersing the olives in a carbonic acid solution which is initially supersaturated with carbon dioxide in the absence of air agitation and heat, and thereafter providing a desirable color in the olives by immersion in a ferrous gluconate solution.

13 Claims, 9 Drawing Figures

METHOD FOR PROCESSING BLACK RIPE OLIVES

FIELD OF THE INVENTION

This invention relates generally to the field of chemical engineering and, more particularly, to the field of food processing and a method and apparatus for the processing of black ripe olives.

BACKGROUND OF THE INVENTION

The olive is a fleshy fruit which, in its natural state, is imbued with an extremely bitter taste which is produced by tannin and other organic acids present in the fruit. Without neutralization of these acids, olives are essentially inedible and are useful only in the production of olive oil. However, with appropriate processing olives are considered by many to be a desirable condiment.

Generally, olives may be processed into two distinct forms known as Spanish green olives and ripe (dark) olives. The processes for the production of each of these two kinds of olives both employ alkaline solutions to at least partially neutralize the acid flesh of the olive. For example, in preparing Spanish green olives the appropriate olives are totally immersed in a lye solution until the lye penetrates about ⅛ inch into the flesh, and then the olives are transferred into a brine-holding solution for partial fermentation. This results in an olive having a flesh pH of about 3.5 and an increased salt content which produces the slightly bitter taste associated with Spanish green olives. During these process steps, any exposure to air is avoided so that oxidation, which produces a darker color, does not occur.

However, with respect to ripe olives, often described as black ripe olives, the effect of oxidation is employed to advantage. In a ripe olive process, the olives are soaked in a dilute lye solution not only to neutralize the acids in the olive to give the preferred taste, but the olives are exposed to air so that the flesh is oxidized to a darker color. For ripe olives, the dilute lye solution is administered in several repetitive steps to develop a dark oxidation ring at the surface of the olive, ending with a "pit lye" step wherein the alkaline solution is allowed to penetrate through the olive flesh to the pit of the olive. The total penetration of the olive flesh by the lye solution results in a nearly neutral pH, e.g., between 7.0 and 8.0.

An older dry process, now largely abandoned, for the production of black ripe olives comprises the treatment of the olives in a dilute lye solution for about three hours followed by the exposure of the olives to air with intermittent fresh water rinsing for one to two days. The lye and exposure steps are repeated until the color change is complete. The total processing time for complete coloration in this process is approximately three weeks, and the intermittent rinsing is required to avoid shriveling and contact marking of the olives thought to result from the constant exposure to lye and air.

A wet process, developed in the late 1940's, has provided significant advantages over the more traditional dry process. The wet process involves alternating the lye solution step with an air-sparged (agitated) fresh water rinse. This has replaced the alternating air-exposure and rinse steps and oxidizes the flesh of the olives by bubbling air through the alkaline solution.

More specifically, during a five- to seven-day period unprocessed olives are immersed in a 0.5 to about 1.5% solution of sodium hydroxide (a lye solution) for periods of from two to twenty-four hours over four to seven days. The strength of the alkaline solution may also be adjusted lower for fresh olives (0.5 to about 0.7%) and higher for storage olives (0.9 to 1.5%), that is, olives which have been stored in a brine solution. As used herein, the term unprocessed olives refers to olives which have yet to undergo complete neutralization of the olive flesh, and includes both fresh and storage olives.

Between each lye immersion, the sodium hydroxide is rinsed from the olives by a succession of from two to eight fresh water rinses. Often, mineral acids such as sulfuric and hydrochloric are added to the rinse water to a pH of 3.0 to 4.5 to assist in removing and neutralizing the lye solution from the surface and flesh of the olive. Typically, in the first lye application the flesh of the olive will be permeated by the sodium hydroxide solution to a depth of from 1/32 to 1/16 of an inch. Upon oxidation by sparged oxygen (air) the neutralized portion will begin to oxidize and darken in color. Each further lye application will progressively increase both the shade of the color and the penetration of the color into the meat of the olives. Generally, between 1/16- and 3/16-inch penetration of an oxidation ring is set into the olives over the course of about a three-day period. Once this color has been set in the oxidation ring to the desired level of penetration, a sustained twenty-four hour lye immersion is applied to the olives until the lye solution reaches the pit of the olive. This step is thus known in the industry as the "pit-lye" step, and results in the flesh of the entire olive being raised to a pH of about 13–14 to neutralize the so-called "bitter principal" of the olives. Without this pit-lye application, the unneutralized flesh of the olives remains so bitter as to be inedible.

Following this pit-lye application, the alkaline residue is rinsed from the olives by repeated fresh water rinses over the course of approximately a twenty-four hour period, with the water being changed about every four hours, until the pH of the olive flesh is reduced to pH 9–10. Mineral acids are not employed to neutralize the alkaline flesh, as the olive has been found to bleach from the low pH required to neutralize the substantial amount of lye in the olive flesh. It will be appreciated that this method of neutralization results in the use of substantial amounts of fresh water. It is also known to employ carbon dioxide as a sparging medium in this final rinse step both to place carbon dioxide in solution with the rinse water and to assist in stirring the olives.

The remainder of the olive treatment process heretofore known consists of treating the olives in a heated water bath of approximately 140°–160° F. for approximately twenty-four hours. This increased temperature is thought to open the pores in the olive skin and assist in withdrawing the lye from the olive at a faster rate. Without heat, lye neutralization has required about two weeks, although this time period may be reduced to four to five days if mineral acid is used to assist in this process. Moreover, this extensive application of heat has traditionally been the only way to develop the preferred dark brown-black olive desired in a black ripe olive within a commercially-acceptable period of time. Without heat, the olives develop a dark brown color at best. Even though the cost of heating the rinse solution is substantial, this step has been considered indispensable in producing high-quality black ripe olives. This heating step is sometimes referred to as a pasteurization process, even though it is not directly related to the inhibition of fermentation.

Following the pasteurization step, there follows approximately a twenty-four hour period during which the olives are cooled along with the heated pasteurizing water. Subsequently, the olives are canned and sterilized according to known methods.

Various iron salts have also been employed for some time in the fixation of color in ripe olives. For example, between five and twenty parts per million of iron in the form of ferrous sulfate, ferrous ammonium sulfate, ferric chloride or ferrous gluconate will fix, i.e., set, the color of black ripe olives. It has been stated that the olives must first be processed to get a good color or the iron salts will not fix the color. In other words, the iron salts will not compensate for poor processing or for poor olives. With respect to the particular iron salts which are used, the most commonly employed salt is ferrous gluconate, primarily because it is the only iron salt approved by the U.S. Food and Drug Administration for use in food products. However, other iron salts have been shown to have an equal or better effect.

In the prior art processes, the ferrous gluconate is added during the pasteurization process, when the pH of the olive flesh is from pH 9 to 10. Since it is well known that heat greatly hastens color fixation, the gluconate is applied at the pasteurization temperatures.

It should be apparent from the description that the processing of black ripe olives has traditionally consumed substantial amounts of energy and water. First, the processing tanks are of considerable size and often retain in excess of 2,500 gallons of solution and many tons of olives. To neutralize the olives after the pit-lye step by changing this amount of water every four hours for a twenty-four hour period produces substantial amounts of waste water which must either be properly disposed of or reprocessed to remove alkaline material. Second, to heat this amount of solution to pasteurization temperatures requires a considerable amount of energy, and thereafter cooling the olives to canning temperature consumes further cooling water, expense and time. In addition, the overall processing time for a batch of olives is critical in that olives should preferably be processed quickly after harvest, and any extensive time period for processing increases storage costs and fruit spoilage.

While demand and economics require faster and more efficient processing, the consumer continues to demand an olive which has a black flesh and an even darker black skin and oxidation ring, and a uniform color from the ring to the pit of the olive. Since the lye progresses through different olives at different rates, some olives will cut (be penetrated by the lye solution) much faster than others. Since the olives cannot be processed individually, attempts to accelerate the curing process have always resulted in a substantial increase of the number of off-color olives which must eventually be separated, manually, prior to canning. In today's market, the consumer demands black ripe olives which are consistently and uniformly black, and will not tolerate variations in color. Even with stringent controls and state of the art processing techniques, such as those described in U.S. Pat. No. 4,463,023 (the teachings of which are hereby incorporated by reference), it is not uncommon to have returns from consumers which are due solely to the color of the olives.

Accordingly, it has been a desideratum to increase both the efficiency of the ripe olive treating process, and to provide a more uniform color in such fruit.

SUMMARY OF THE INVENTION

According to the present invention, a new and improved method and apparatus for the wet processing of black ripe olives provides distinct advantages over the prior art methods. First, the method eliminates the need for the addition of heat to the olives or the olive processing solutions enabling a substantial savings both in heating costs and the time and expense required to cool the olives for further processing. Second, the total ripe olive process is shortened from seven days to as short as three days, thus providing substantial savings in labor costs and plant efficiency. In fact, it has been shown that olives of uniform desired color may be obtained without any of the repeated initial lye applications, that is, with the only lye immersion-oxidation step being the pit-lye immersion. Third, all but one of the repeated fresh water rinses following the pit-lye step are eliminated. This allows savings in water consumption and water disposal costs. Fourth, a substantial increase in the color uniformity of the olives is obtained, with a reduction in the need for constant supervision of the process.

Broadly, the invention comprises immersing the olives in a supersaturated solution of carbon dioxide in water at ambient temperature after the bitter principal of the olives has been neutralized, such as by the pit-lye step of the traditional processes. Following immersion in this supersaturated solution, the olives are treated at ambient temperature in a solution of iron salts, such as a ferrous gluconate solution, to produce a uniform dark or black color in the olives.

In another aspect of the invention, an apparatus is provided to facilitate the formation of the supersaturated carbonic acid solution by mixing the carbon dioxide with water in a conduit under several atmospheres of pressure, such as by providing a header pipe of standing water above the pump and carbon dioxide infusion point and maintaining this pressure until the solution is introduced into the processing tank. While I do not wish to be bound to any particular theory, it appears that mixing the carbon dioxide with water under pressure produces a solution which appears to open the pores of the olive to allow the extraction of lye and, upon the addition of iron salts to the olives, results in a uniform color which is unobtainable through the use of other neutralizing or rinsing means. The most striking effect of the supersaturated carbonic acid neutralizing solution is that the olives may be rinsed, neutralized and a uniform color set in the absence of heating the olives. For example, the entire olive process may be conducted at ambient temperature, as low as 50° F. It will be appreciated that this results in a significant savings in fuel and apparatus for both heating and cooling of the olives.

DETAILED DESCRIPTION OF A PREFERRED EMBODIMENT

Figure 1:
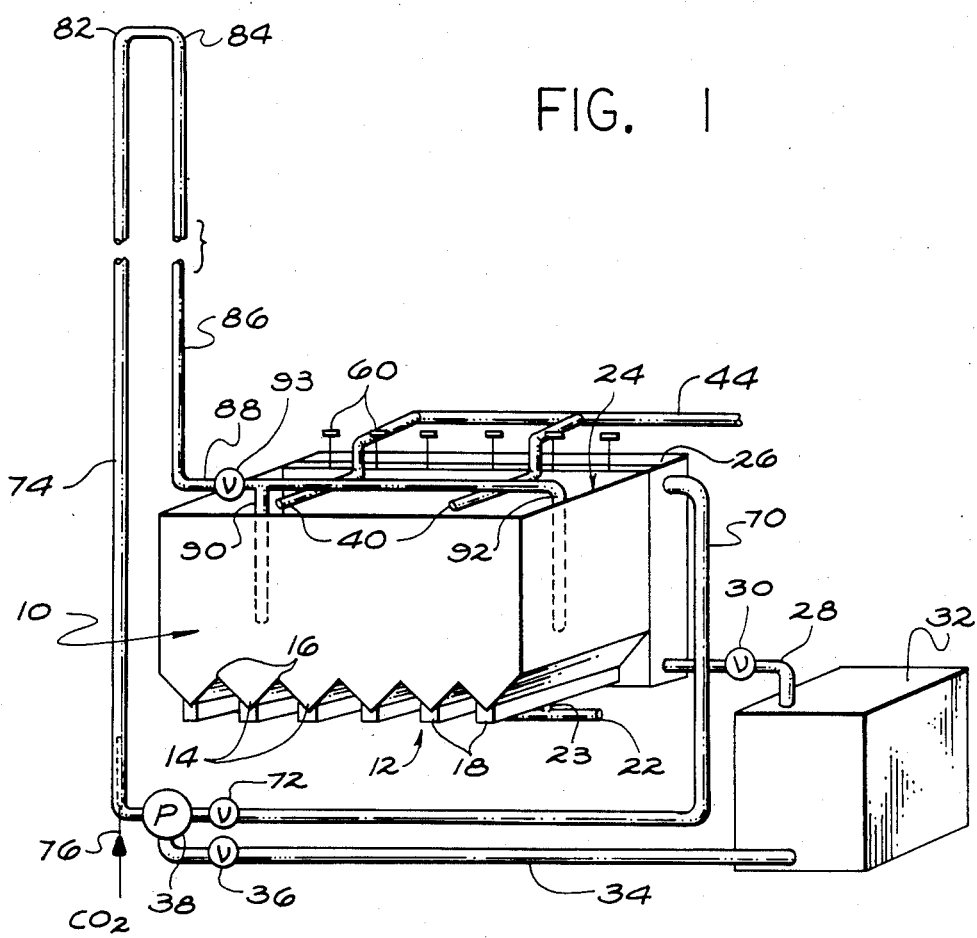
FIG. 1 shows a perspective and partially schematic view of the apparatus for carrying out the method of the present invention.

Turning first to FIG. 1, a processing tank 10 has a bottom 12 made up of a plurality of corrugations forming valleys 14 and peaks 16 which extend across the tank bottom 12. The tank 10 has dimensions of about twenty feet by twelve feet by four feet deep, and holds about ten tons of olives and three-thousand gallons of solution for processing. An air manifold 18 extends along the external portion of the bottom of each valley and encloses the bottom of the respective valley 14. Manifolds 18 are connected to a pressurized air supply line 22 by manifold supply lines 23. When the air supply line 22 is pressurized, the air flows into the air manifolds 18. A plurality of holes (described in detail with respect to FIG. 6) along the length of valleys 14, allow the pressurized air to enter into the tank 10. The air entering at the bottom of the valleys 14 bubbles upwardly through whatever fluid is present. A gate 24 separates one end of the processing tank 10 from a drain flume 26.

A drain line 28 connects the bottom of the flume 26 through a solenoid operated valve 30 to an alkaline solution storage tank 32. The storage tank 32 may be positioned at a lower level than the processing tank 10 so that gravity will drain the alkaline solution from the tank 10 into the tank 32, or a pump may be incorporated into the drain line 28 to transfer solutions to other storage means. The storage tank 32 is connected by an alkaline supply line 34 and a valve 36 to the suction of a pump 38. Alternatively, the alkaline supply may be conducted directly to the tank 10 by other means, although routing the alkaline solutions through the pump 38, as hereinafter described, is preferred due to efficiency.

Figure 2:
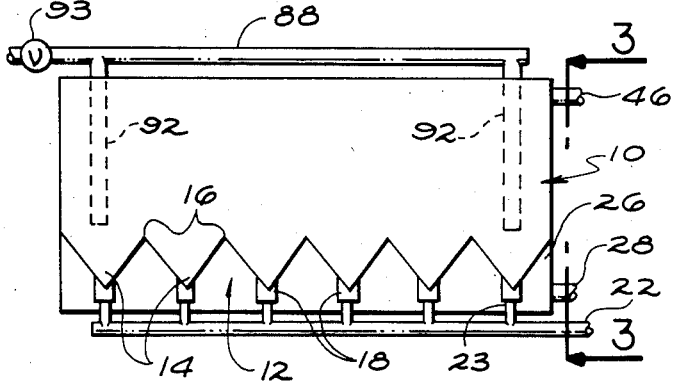
FIG. 2 shows a front elevational view of a processing tank of FIG. 1.
Figure 3:
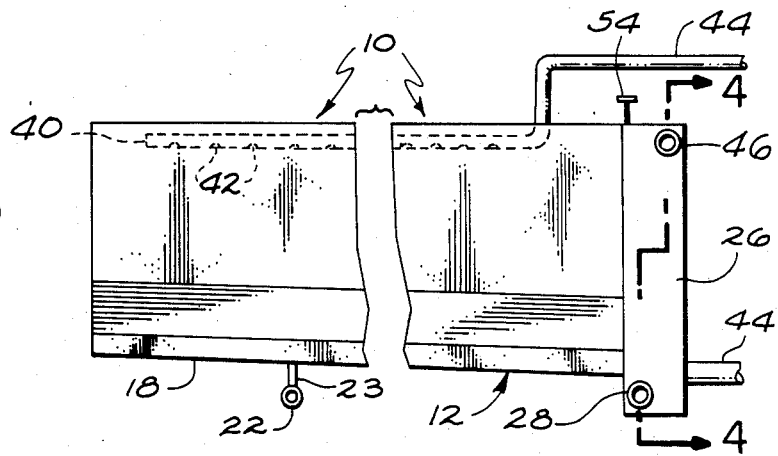
FIG. 3 shows a side elevational view of the processing tank taken along the line 3—3 of FIG. 2.
Figure 4:
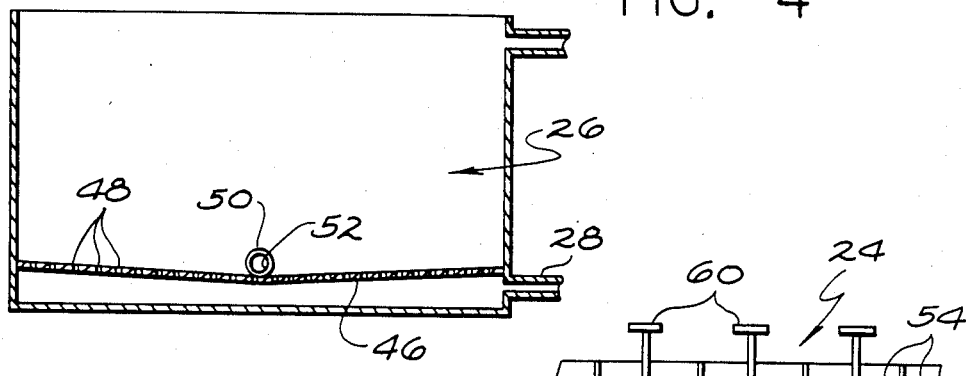
FIG. 4 shows a cross-sectional view of the flume of FIG. 3, taken along the line 4—4 of the preceding figure.

FIG. 2 shows the manifold supply lines 23 connecting the air supply line 22 to the air manifolds 18. FIG. 3 shows the processing tank 12 sloping downwards towards the end of the processing tank 10 on which the flume 26 is disposed. Also seen in FIG. 3, and in FIG. 1, are acid supply lines 40 which are positioned about 10 inches above the level of the solution in tank 10, and which includes perforations 42 for purposes hereinafter described. The supply lines 40 are seen in FIG. 1, to communicate with a manifold 44 to facilitate the addition of mineral acid to the processing solutions. As shown in FIG. 4, the flume 26 has a bottom 46 having perforations 48 therein, and which allows the solution to reach the inlet of the alkaline drain line 28 while still providing a guide for the olives poured toward the olive drain line 50. The perforated bottom 46 slants downwardly towards the center of the flume 26 where the olives pass through an opening into the flume 26 so that the olives may be hydraulically drained from the tank 10 by methods which are known in the art. In addition, the perforations may be made small enough to strain olive particles and thus prevent particles from entering the lye tank.

Figure 5:
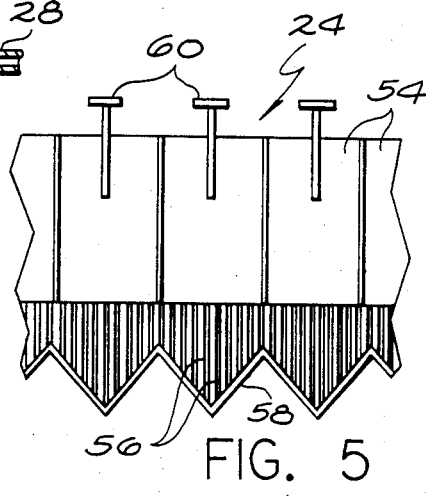
FIG. 5 shows a portion of the gate which separates the olive-containing portion of the processing tank from the flume.

FIG. 5 shows a portion of the gate 24 which is formed by a plurality of plates 54 each having attached to the bottom end thereof a plurality of spaced apart vertical rods 56. The rods 56 are joined together at their terminal ends by caps 58 thus forming an overall corrugated shape which conforms to the corrugations at the flume 26 and of the processing tank 10. The spaced apart rods 56 allow solution to pass between the flume 26 and processing tank 10 without allowing olives to pass. When it is desired to allow the olives to pass into the flume 26, the gate 24 is opened by raising one or more of the handles 60 and vertically lifting one or more of the plates 54 to provide a passage for the olives into the flume 26 from the processing tank 10.

Figure 6:
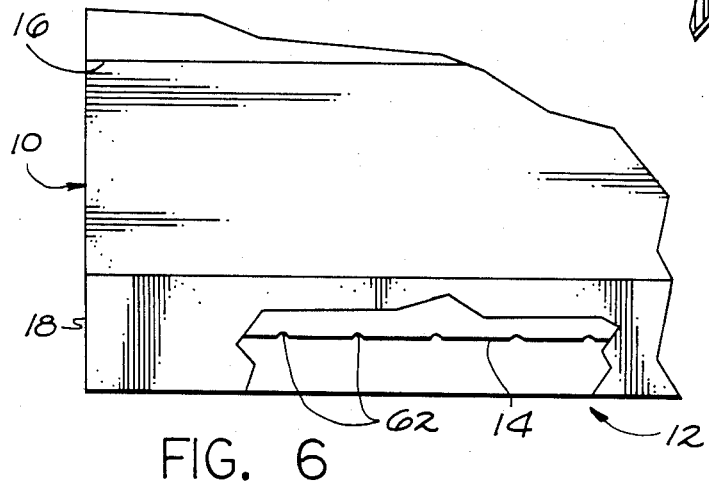
FIG. 6 shows an enlarged partially cutaway side elevational view of the bottom right-hand front corner of the processing tank of FIG. 1.

In FIG. 6 it can be seen that the bottom of each valley 14 has a plurality of spaced apart holes 62 each about $\frac{1}{8}$-inch in diameter, drilled through the bottom at the point of the valley to allow air from the manifold 18 to enter the processing tank 10 along the length of the bottom of the valley 14. The holes 62 are spaced apart center to center, a distance of about two inches along the length of each valley 14.

Figure 7:
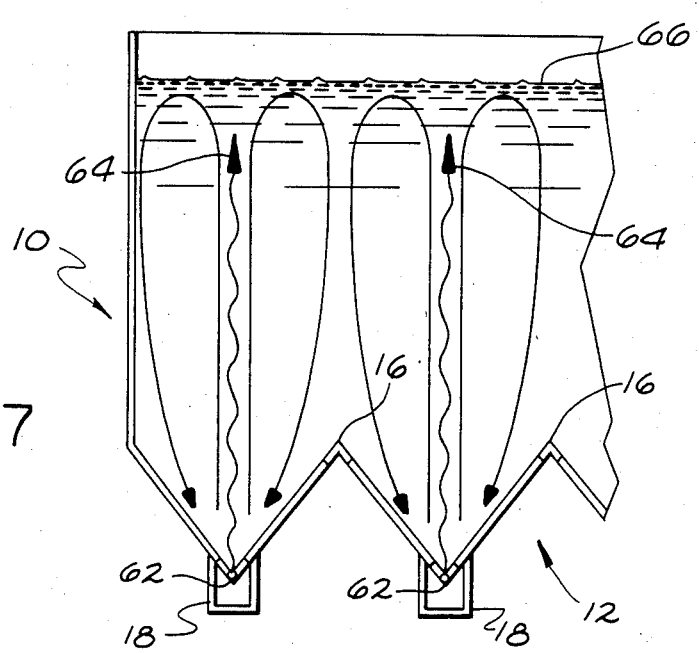
FIG. 7 is a schematic view showing the olive circulation within the processing tank 10 during air agitation.

FIG. 7 is a schematic view illustrating the effectiveness of the corrugated bottom 12 combined with the compressed air injected along the valleys in improving the agitation of the olives in the processing tank 10. With the corrugated bottom 12, the olives would tend to concentrate in the valleys 14 above the plurality of holes 62 connecting the manifolds 18 to the processing tank 10. When the manifolds 18 are pressurized a sheet or curtain of air bubbles 64 will rise along the entire length of the bottom of each valley 14 towards the surface 66 of the solution in which the olives are immersed. The rising curtain of air bubbles 64 will cause the olives in the processing tank 10 directly above the bottom of each valley 14 to migrate upwardly. Olives located along the sloping sides of the valleys 14 will then fall towards the space previously occupied by the olives lifted by the air curtain 66, i.e., toward the bottom of the valley 14. A uniform distribution and circulation of the olives from bottom to top through the processing tank 10 will result. Very little, if any, damage will result to any of the olives from lack of movement of the olives in the tank during the application of the lye.

Turning now to portions of the described apparatus which are more relevant to the present invention, it will be noted that an overflow pipe 70 is connected at the top of the flume 26. This overflow pipe 70 is disposed at a height which is appropriate to maintain the desired solution level within the tank 10, generally about ten to twelve inches from the upper edge thereof. The line 70, thus controlling the fluid level in the tank 10, is seen to course through a valve 72 and thereafter through the pump 38. After exiting the pump 38, the pumped solution is seen to flow into a header pipe 74.

Figure 8:
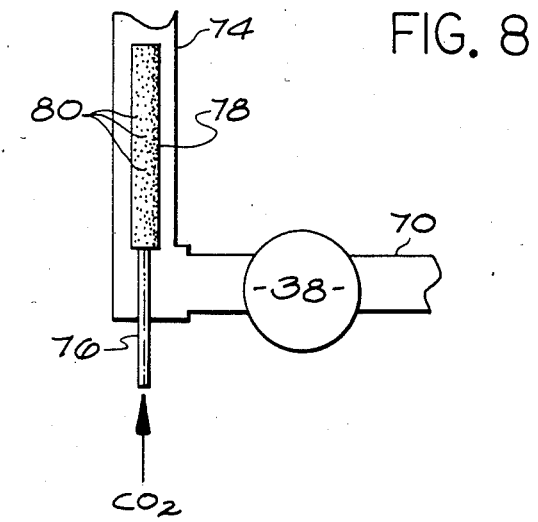
FIG. 8 is a schematic cross-sectional view of the pump 38 and the apparatus for the addition of carbon dioxide to the apparatus.

Turning now to FIG. 8, the addition of carbon dioxide gas to the tank 10 will be described. The carbon dioxide is seen to be added to an inlet 76, and then flows into a cylinder 78 which is enclosed within the header pipe 74. The cylinder 78 in this embodiment is constructed of one-inch pipe about eighteen inches long, and is seen to include a plurality of perforations 80, each of said perforations about $\frac{1}{8}$ inch in diameter spaced about one inch apart, to facilitate dispersion of the carbon dioxide into the solution in the header pipe 74. Following the injection of the $CO_2$ through the cylinder 78, the header pipe 74 is seen to continue vertically, in FIG. 1, for a substantial distance. In the preferred embodiment, the header pipe 74 attains a height of 32 feet above the pump 38, whereupon the pipe 74 returns to the tank 10 via two right-angled bends 82 and 84 and a feeder pipe 86. The feeder pipe 86 then turns toward the processing tank 10 and continues as a crossover line 88 into the delivery pipes 90 and 92 which terminate at open ends about 2 feet below the surface of the processing fluid, and thus deliver the pumped solution therethrough into the processing tank 10. A valve 93 is seen to be disposed in the line 88 prior to the delivery pipes 90 and 92 to adjustably restrict the flow of solution into the tank 10.

It should be noted that the discharge of carbon dioxide into the returning solution at the base of the header pipe 74 occurs under tremendous pressure and thus ensures the dispersion, and solution, of carbon dioxide which supersaturate the solution which is fed to the processing tank 10 through the feed delivery pipes 90 and 92. The feed of the solution under pressure from the pump 38, against the flow restriction of the valve 93, also assists in maintaining the carbon dioxide in the solution. An important aspect of the process described herein is the formation of a water solution having carbon dioxide dissolved therein under pressure, that is, the use of a solution which is initially supersaturated with carbon dioxide, and the maintenance of this carbon dioxide within the solution rather than allowing the gas to escape into the atmosphere. As used in this context, such a solution is referred to as a supersaturated carbonic acid solution. The purposes and effects of this solution will be described more fully hereinafter.

Figure 9:
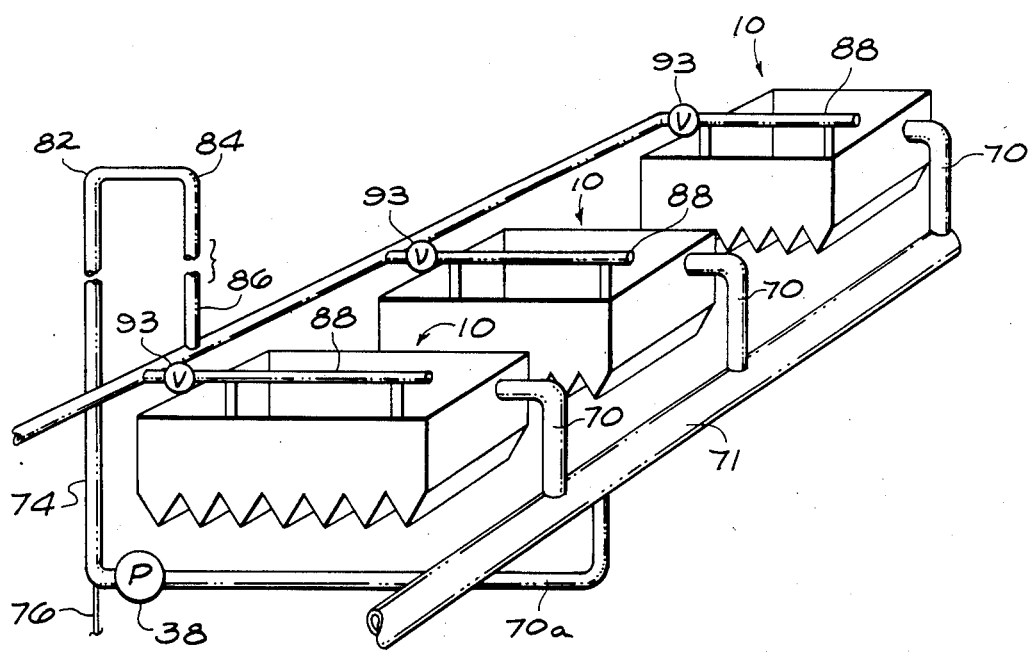
FIG. 9 is a perspective, schematic view of a plurality of tanks, and the solution recirculating system according to the present invention.

Turning now to FIG. 9, a particularly advantageous method for the operation of a plurality of processing tanks 10 is shown. From each of the processing tanks, an overflow line 70 similar to that described above is shown. The overflow line 70, in this instance, delivers the overflow solution to a manifold 71, and thereafter the flow from the plurality of tanks 10 is led through a collective overflow 70a to the pump 38. In a manner similar to that described above, carbon dioxide is injected at the discharge side of the pump 38, and the solution is routed through a header pipe 74 and a feeder pipe 86 to an input manifold 87. Thereafter, the returned solution is directed, by the manifold 87, to the individual crossover pipes 88, and thereafter into the processing solutions as described with respect to FIG. 1.

This manifolding method adds substantially to the uniformity in color of the olives produced by the present invention when a plurality of tanks is employed. Historically, the color and texture of black ripe olives has varied widely in different processing tanks due to the inherent difficulty in maintaining comparable chemical levels. Accordingly, the olives in one tank may process substantially faster or slower than those in other tanks due primarily to variations in estimating lye penetration or other matters of chemical balance. In this instance, due to the recirculation of the processing solutions through all tanks, the chemical concentrations in all tanks will be essentially identical.

The method according to the present invention may include the periodic application of a lye solution at an ambient temperature of about 60°-65° F. at a strength of approximately 1.2% to 1.5% by weight. This concentration is preferred for storage olives, that is, olives which have been stored for several weeks in brine solution. Generally, an alkaline solution having a concentration of about 0.45%-0.7% is appropriate for processing fresh olives, but as the vast majority of olives processed in commercial plants are brine-stored olives, the concentrations recited herein will pertain to storage olives. Generally, an alkaline solution having a concentration of about 0.9%-1.5% is appropriate for such storage olives.

In a specific example, ten tons of storage olives per tank were initially transported into eleven tanks 10 in a brine solution, which was then drained by appropriate means which are not specifically referred to in the accompanying drawings. A 1.5 weight percent lye solution was then pumped from the supply tank tube by the opening of the valve 36 and the operation of the pump 38. The processing tank was filled with the alkaline solution above the level of the olives with the level of the solution being about one and a half to two times the level of the olives. The level of the olives in the processing tank 10 is generally determined, as is known in the art, in order to avoid adverse pressure on the olives which lay towards the bottom of the tank 10. In order to oxidize the olives and to prevent contact marks which result from the olives touching the tank 10 or other olives, pressurized air at approximately two pounds per square inch was supplied to the manifolds 18. This air was injected at all times during the lye treatment. The agitation circulation patterns shown in FIG. 7 were thus developed.

The olives were immersed in this initial lye solution until the lye had penetrated to a depth of approximately 1/32 to 1/16 of an inch in the olives. This was determined by visually inspecting the olives. Generally, the average time for the initial lye application is approximately ten to twelve hours.

Thereafter, the valve 30 was opened to drain the alkaline solution from the tank 10 to the lye storage tank 32. While in the tank 32, the lye solution was refortified to 1.5% for the second lye application. Immediately following the draining of the lye from the tank, fresh water was applied to the tank 10, and the air pressure was restarted to stir the olives.

When the fresh water in the tank 10 had reached the level of the inlet of the overflow pipe 70, approximately one gallon of 36% sulfuric acid was added per ten tons of olives per tank, by spraying into the tank from the acid supply lines 40, to lower the pH of the water to about 4.0. This acid is to neutralize the lye residue remaining on the surface of the olives, and within the light-brown oxidation ring formed by the initial lye application. The valve 72 was opened (with the valve 36 closed) and the pump 38 activated to recirculate the mineral acid solution within the tank 10 and through the plurality of tanks as shown in FIG. 9. The pH range was maintained at 3.5 to 5.5 for approximately two hours, and then the water in the tank was maintained at pH 5.0 to 7.0 for an additional eight-hour period. A pH monitor, being placed in the overflow line and the manifolds 71 and 87, facilitates uniform pH conditions throughout the eleven tanks in the commercial system.

Following the mineral acid rinse, the mineral acid solution, now at a nearly neutral pH, was drained from the tank 10 and a second lye application with the refortified 1.5% alkaline solution from the storage tank 32 was begun. This second lye application was identical to the initial lye application, except that the immersion was continued for about one and a half hours until the lye solution penetrates into the flesh of the olives approximately ⅛ inch. The average time on this second lye application is approximately one to two hours. Following the second lye application, the lye was again returned to the holding tank 32 and the acid rinse solution was returned to again neutralize the lye residue in and on the olives. Due to the further penetration of the lye into the olives, nearly double the amount of acid (two gallons of 36% sulfuric acid per ten tons of olives per tank) was required to be added to neutralize the lye residue. Again, the pH monitor-controller maintained the pH at a range of from pH 5.0 to 7.0 for about two hours.

Thereafter, the neutralizing solution was again drained and a third lye application, under similar conditions, undertaken until the depth penetration of the olives averages about 3/16 of an inch. The average time for this lye application is about one to two hours. Following this third lye application, the alkaline solution was again returned to the storage and reclaiming tank 32, and fresh water was again added to the tank 10 with air sparging. Due to the excessive lye residue after this third lye application, one water change was made after one hour. After the tank is refilled, three gallons of 36% sulfuric acid per ten tons of olive per tank was added through the acid pipes 40, and this neutralization process is continued for about two hours.

As described above, three successive lye applications, in the presence of oxygen provided by the sparged air, set progressively deeper oxidation rings in the olives. Each lye application increased both the shade of the color, from beige to brown, and the penetration of the color into the flesh of the olives. Once the brown color had been set in the oxidation ring to about 3/16 of an inch, a sustained lye treatment was applied to the olives in the tank 10 by a return of the 1.5% lye solution until the lye penetrates to the pit of the olive, to destroy the bitter principal therein. This pit-lye step raised the pH of the flesh of the olive to about 13 to 14.

As explained above, prior art processes proceed after the pit-lye application with at least four to five repeated fresh water rinses over the course of approximately a twenty-four hour period. Even with water changes every four hours, it takes twenty-four hours to get the pH of the olive down to about 9 to 10, due to the excessive amount of lye in the olive flesh. If mineral acids are employed at this point to hasten the neutralization process, the olives bleach due to the low pH required, and accordingly such acids have not been employed in the final neutralization step. U.S. Pat. No. 4,463,023 teaches the use of carbon dioxide gas injected through the manifold 18 and the spaced apart holes 60. This carbon dioxide, in the form of bubbles similar to those described with respect to FIG. 7, assists both in the agitation of the olives and in the neutralization of the alkalinity of the olives.

Following the neutralization of the olives after the pit-lye application to a pH of 9 to 10, traditional methods include what has been termed the pasteurization of the olives in a water bath which is steam-heated to approximately 140°–160° F. for approximately twenty-four hours. At this point, due to the addition of heat and the fact that the pH of the olive flesh has been substantially lowered by the water rinses, mineral acids such as sulfuric may be added without bleaching the olives' flesh. When mineral acids are added to attain a pH of 3.5 in the heated rinse solution, it has generally taken twenty-four hours to neutralize the flesh of the olives. During this heating step, iron salts such as ferrous gluconate are added to the heated solution to set the color.

Following this "pasteurization" process, the olives are traditionally cooled by recirculating fresh water or otherwise. The gate 24 is then lifted so that the olives roll down the sloping floor of the tank into the flume. Since the flume 26 is sloped toward the center, the olives are directed into the opening 52 of the outlet pipe 50 with some of the solution while the rest of the solution may drain through the flume floor holes 48. The olives are pumped through the drain 50 by means of a pump (not shown).

The Addition of Supersaturated Carbonic Acid

According to the present invention, however, following the pit-lye application, the olives were first rinsed in fresh water for two hours to remove the lye residue from the surface of the olives. After two hours, this rinse solution was removed and disposed of as waste water. In contrast with the multiplicity of fresh water rinses which are required in the prior art process, this is the only fresh water rinse required, following the pit-lye application, in the present invention. Following this rinse, the processing tank was refilled with fresh water, and the overflow system, including the overflow pipe 70, the pump 38, header tank 74 and the crossover lines 88 were employed to recirculate the fresh water solution. Immediately upon operation of the pump 38, carbon dioxide was continuously added via the inlet 76 and the cylinder 78, as described, to form a supersaturated carbonic acid solution which was recycled in the apparatus. The valves 93 on the crossover line 88 of each of the tanks 10 were maintained in a partially closed position so that pressure is maintained throughout the carbonic acid feed system. In this way, the carbonic acid solution is recirculated in the essential absence of carbon dioxide bubble formation in any of the tanks 10. This recycle was continued until the lye in the olives was neutralized to a pH of less than 8.0, preferably 7.5 to 8.0. During this carbonic acid recycle, which generally lasts from about four to seven hours, the olives remained at an ambient temperature of about 55°–65° F. The processing solution was not heated during this neutralization process.

While the carbon dioxide was added at all times during the recycling of the carbonic acid in this example, it is to be understood that the terms "continuous" or "continuously" when used with respect to the addition of carbon dioxide or the recycling of the various solutions described includes periodic activity which results in the same advantages provided by continuous use.

Tests of the acidity of the neutralizing solution were performed three and one-half hours after the beginning of the carbon dioxide infusion. The pH of the solution at the outlet (overflow) of the first of the eleven tanks was 5.59, and the pH at the inlet of the last of the eleven tanks was 5.61. At that time, the pH of the olives in the tanks was tested by cutting several of the olives in half, covering the cut surface with a solution of phenolphthalein, and noting the extent of the change of color over the surface. By this method, about one-half of the flesh of each olive, after one fresh water rinse and three and one-half hours of treatment with carbon dioxide, had been neutralized to a pH of 8.3.

It is preferred that carbon dioxide or air sparging (i.e., agitation) of the carbonic acid solution be avoided due to the fact that such agitation serves to expel carbon dioxide from the solution and substantially diminish the advantages provided by the invention.

The Addition of Ferrous Gluconate

When the olive flesh was less than 8.0, a solution of ferrous gluconate was added through the acid acid inlet pipes 40. This iron solution was prepared by mixing 220 pounds of ferrous gluconate (prepared in solution as described) with the total of about 30,000 gallons of water. The total solution strength was thus about 0.09 weight percent ferrous gluconate, and amounted to about one and one-half to two pounds of ferrous gluconate per ton of olives. This ferrous gluconate solution was operated through the recycling overflow system for about twelve hours, with periodic air sparging to prevent contact marks on the olives, and was thereafter drained from the tank. All olives had a uniform black color, with a slightly darker oxidation ring. The olives were then drained by gravity flow and transported to the cannery for final processing.

It has been found that a 0.045% solution does not give a uniform color to the olives, and if the concentration of solution is increased to 0.130 weight percent, the color change is uncontrollable and the olives attain a uniform black color rather than the dark brown flesh-black skin appearance which is desired. Since ferrous gluconate contains about 19.18% iron, and since a wide variety of iron salts has been shown to have an activity similar to ferrous gluconate in the processing of ripe olives, this coloring solution may be defined as a solution of iron salts having an iron content of from 0.009 to 0.026 weight percent iron.

It has also been found that the iron salts must be added to the processing tank 10 in solution form, as the dispersion of solid ferrous gluconate into the tank at ambient temperature prevents the dissolution of the salt. In particular, water is heated to 160° F. in a 100-gallon steel tank, and 220 pounds of ferrous gluconate are added thereto and mixed with an impeller mixer. Thereafter, this solution is added to the water rinsing solution as described above.

It will be appreciated that the method of the present invention involves significant differences and advantages over the prior art process. First, the neutralization and color-setting following the pit-lye application are conducted at ambient temperature, and the neutralization is attained solely by the use of a supersaturated carbonic acid solution. This super-saturated carbonic acid solution lowers the pH of the olive flesh from 13 to 14 to less than pH 8 in as little as seven hours, while the prior art processes employing mineral acids and heat take as long as fourteen hours. In addition, ferrous gluconate is employed as the primary coloring agent. In contrast with prior art processes wherein the color was dependent on the repetitive lye-oxidation steps, and only "set" or "fixed" by iron salts, the method of the present invention provides uniform black ripe olives from light-brown olives which result from but one pit-lye application.

In an example of the substantial decrease in processing time which is provided by the invention, Manzanillo storage olives, previously unprocessed, were immersed in a 1.5 weight percent lye solution, with air sparging, for fifteen hours at an ambient temperature of about 65° F. After fifteen hours, the lye had penetrated to the pits of the olives and the olive flesh had a pH of greater than 13. The color of the olives after this pit-lye step was light brown to brown, with no oxidation ring, which would be inappropriate for further processing according to traditional methods.

Following the pit-lye immersion, these olives were immersed in fresh water for two hours to remove the lye residue from the surface, and after this first rinse was drained additional water was added and recirculated through the carbon dioxide addition system described above to provide a supersaturated carbonic acid rinse solution. This immersion was then continued for seven hours at 65° F., whereupon, the olives were determined to be 100% neutralized since the flesh of test olives had a pH of less than 8. During the carbonic acid rinse, the air sparging apparatus was not operated. When the flesh of the olives had reached a pH of less than 8 the carbon dioxide addition was discontinued and about two pounds of ferrous gluconate per ton of olives, in a solution prepared as described above, was added to the processing tank. This solution was circulated with the recycle overflow system for about twelve hours. During this time, air was applied two times during a six-hour period in order to assist in preventing contact marks of the olives. Subsequently, the ferrous gluconate solution was drained from the tank, fresh water was added and the olives were drained from the tanks by gravity flow to be transported to the cannery to be further processed. Following the immersion in the gluconate solution, all olives had a uniform black color on the outside, to a depth of about 1/16 of an inch, and a very dark brown flesh between the surface and the olive pit. This color was virtually indistinguishable from olives, treated separately in the above-described process, which had previously been processed through three successive initial lye penetrations (the traditional method) to form an oxidation ring in the flesh of the olives to a depth of 3/16 inch.

It will be appreciated that significant cost savings are obtained by the apparatus and method of the present invention. First, processing black ripe olives without requiring the heating of 30,000 gallons of water to 160° F. involves a substantial savings in energy. Further, the need for substantial amounts of repeated fresh water rinses, and the accompanying treatment of the waste water from the process, as well as processing labor costs, amount to substantial savings. Further, the use of a supersaturated carbonic acid rinse solution followed by a ferrous gluconate solution, as described, results in a more uniform surface color, virtually eliminating returns from consumers based upon imperfect colors. Moreover, as has been shown in the specific example set forth above, the use of the supersaturated carbonic acid solution and iron salts enables a commercial process of only one to two days in length, with the accompanying additional savings in both time and materials.

The foregoing description of the invention has been directed to a particular preferred embodiment and for the purpose of explanation. It will be apparent, however, to those of ordinary skill in the art that many modifications and changes both in the apparatus and the method may be made without departing from the scope and spirit of the invention.

I claim:

1. In a method for producing black ripe olives from unprocessed olives, said method including:
    (1) immersing the unprocessed olives in a dilute alkaline solution for a period of time which is sufficient to increase the pH of the flesh of the olives to at least about 12, and (2) exposing the olives to oxygen for a period of time sufficient to oxidize, and thus darken the color of at least a portion of the olive flesh, the improvement comprising:

(a) immersing the olives in a carbonic acid solution which is initially supersaturated with carbon dioxide and continuously recycled, formed by continuously adding carbon dioxide to water under pressure, until the flesh of the olives reaches a pH of less than 8.0, and (b) exposing the olives to a solution of an iron salt for a period of time which is sufficient to further darken the color of the olives.

2. The method and improvement of claim 1 wherein the olives are neutralized in the carbonic acid solution, and the carbon dioxide is added thereto, in the substantial absence of carbon dioxide bubble formation or carbon dioxide bubble agitation of the solution.

3. The method and improvement of claim 1 or 2 wherein steps (a) and (b) are conducted in the absence of raising the temperature of the solution above 140° F.

4. The method and improvement of claim 3 wherein the iron salt is present in the solution in a concentration of from about 0.009 to 0.026 weight percent.

5. The method and improvement of claim 3 wherein the iron salt is selected from the group consisting of ferrous gluconate, ferrous sulfate, ferrous ammonium sulfate and ferric chloride.

6. A method for producing black ripe olives from unprocessed olives, comprising:

immersing the unprocessed olives in a lye solution until the lye solution completely penetrates the flesh of the olives;

separating the olives from the lye solution; immersing the olives in a recycling carbonic acid solution which is continuously supersaturated with carbon dioxide under pressure until the flesh of the olives is neutralized to a pH of less than about 8.0; and immersing the olives in a solution of iron salts having an iron content of from about 0.009 to 0.026 weight percent iron for a period of time which is sufficient to darken the color of the olives.

7. The method of claim 6 wherein the unprocessed are immersed in the lye solution until the flesh of the olives is increased to a pH of at least about 12.0.

8. The method of claim 6 wherein the carbonic acid solution has a pH of less than about 6.0.

9. The method of claim 6, 7 or 8 wherein the process is conducted at ambient temperature.

10. A method for producing black ripe olives from unprocessed olives, comprising:

immersing the unprocessed olives in an alkaline solution until the solution completely penetrates the flesh of the olives;

separating the olives from the alkaline solution; and immersing the olives in a carbonic acid solution which is initially supersaturated with carbon dioxide under pressure and continuously recycled, and which contains in solution an iron salt for a period of time which is sufficient to neutralize and darken the flesh of the olives.

11. The method of claim 10 wherein the process is conducted at ambient temperature.

12. The method of claim 10 or 11 wherein the iron salt is selected from the group consisting of ferrous gluconate, ferrous sulfate, ferrous ammonium sulfate and ferric chloride.

13. The method of claim 10, 11 or 12 wherein the solution contains iron in a concentration of from about 0.009 to 0.026 weight percent.

* * * * *

UNITED STATES PATENT AND TRADEMARK OFFICE
CERTIFICATE OF CORRECTION

PATENT NO. : 4,664,926

DATED : May 12, 1987

INVENTOR(S) : HERSHELL SCRIMSHIRE

It is certified that error appears in the above—identified patent and that said Letters Patent is hereby corrected as shown below:

Column 11, line 6, after "the", delete "acid"; and

Column 14, line 8, after "unprocessed", insert --olives--.

Signed and Sealed this

Twenty-seventh Day of October, 1987

Attest:

DONALD J. QUIGG

Attesting Officer

Commissioner of Patents and Trademarks